United States Patent [19]

Cherny et al.

[11] 4,116,592
[45] Sep. 26, 1978

[54] TURBOMOLECULAR HIGH-VACUUM PULP

[76] Inventors: Viktor Yakovlevich Cherny, ulitsa Zoi Kosmodemyanskoi 3, kv. 45; Boris Grigorievich Galperin, ulitsa Rozenshteina 36, kv. 22; Mikhail Mikhailovich Mikhailov, ulitsa Marshala Govorova 16, kv. 165; Vladimir Petrovich Meljukhov, ulitsa III Internatsionala 74, kv. 39; Leonid Vasilievich Dobrokhotov, ulitsa Partizana Germana 33, kv. 155, all of Leningrad, U.S.S.R.

[21] Appl. No.: 716,258

[22] Filed: Aug. 20, 1976

[51] Int. Cl.$^2$ ............................................. F04B 17/00
[52] U.S. Cl. ................................... 417/424; 310/112; 415/90
[58] Field of Search ................... 415/90; 417/424, 411; 310/112, 114; 184/43

[56] References Cited

U.S. PATENT DOCUMENTS

| | | | |
|---|---|---|---|
| 3,168,977 | 2/1965 | Garnier et al. | 415/90 |
| 3,628,894 | 12/1971 | Ferguson et al. | 415/90 |
| 3,749,528 | 7/1973 | Rousseau et al. | 415/90 |
| 3,753,623 | 8/1973 | Wutz | 415/90 |
| 3,947,193 | 3/1976 | Maurice | 415/90 |
| 3,969,042 | 7/1976 | Bachler | 415/90 |

FOREIGN PATENT DOCUMENTS

| | | | |
|---|---|---|---|
| 2,349,033 | 10/1975 | Fed. Rep. of Germany | 415/90 |
| 746,920 | 3/1956 | United Kingdom | 310/112 |

Primary Examiner—C. J. Husar
Attorney, Agent, or Firm—Haseltine, Lake & Waters

[57] ABSTRACT

A turbomolecular high-vacuum pump has a substantially vertically extending cylindrical casing provided with inlet and outlet pipes for gas being evacuated. The casing accommodates, in the top part thereof, a stator having vanes disposed between the rotor vanes so as to define passages for gas being evacuated. The rotor is connected to a high-speed hollow shaft extending substantially vertically. The shaft is journalled in bearings and connected to the rotor by means of a high-frequency electric drive motor. The pump incorporates means for lubricating the bearings. The stator of the high-frequency drive motor of the pump is electrically coupled to the stator of a generator of a machine-type frequency converter which has an induction drive motor. Another, low-speed shaft is journalled in the bearings in the bottom part of the pump casing coaxially with the high-speed shaft, one shaft embracing the other. The induction motor rotor and the rotor of the generator of the machine-type frequency converter are mounted on the low-speed shaft, the stators of both devices being fixed within the pump casing. Means for lubricating the bearings of both shafts is disposed at the lower end of the low-speed shaft.

16 Claims, 3 Drawing Figures

TURBOMOLECULAR HIGH-VACUUM PULP

The present invention relates to the equipment designed for obtaining high vacuum, and more particularly, to turbomolecular high-vacuum pumps.

The pumps of this type are high-speed machines in which the rotational speed of the rotor is as high as tens of thousands rpm.

Turbomolecular high-vacuum pumps are widely used for obtaining high vacuum in atomic particle accelerators, reflectors and receivers of particles; in chambers simulating open space conditions; in mass-spectrometers, gas analyzers and electrone microscopes; in application of coatings and sputtering; in the manufacture of vacuum tubes. ERTs, X-ray and special tubes; in vacuum metal production; in plasma physics; in growing crystals and in other fields.

The invention may be advantageously used for evacuation of various vessels to a pressure of $1.10^{-10} - 1.10^{-11}$ Torr.

There are two types of turbomolecular pumps:
two-flow pumps with a horizontally extending shaft, in which identical stacks of stator and rotor discs are symetrically arranged within the pump casing on both sides of the inlet pipe;
single-flow pumps with a vertically extending shaft.

Two-flow pumps with a horizontally extending shaft occupy a large floor space, they are not compact and do not allow rational utilization of working space.

This disadvantage is partially eliminated in known turbomolecular pumps of the second type, that is in the single-flow pumps with a vertically extending shaft.

At present, the development of turbomolecular pumps is associated with the following main problems:
provision of compact construction (especially in the plan view);
provision of self-maintaining operation (especially for movable vacuum stations, such as those used for assembly lines).
provision for simple and convenient operation;
improved reliability and increased service life.

Known in the art is a turbomolecular high-vacuum pump. This pump comprises a vertically extending cylindrical casing having inlet and outlet pipes for gas being evacuated, the casing accommodating, in the top part thereof, a vane type stator. Rotor vanes are disposed between the stator vanes, and the rotor is fixed to the end of a high-speed shaft extending vertically. The shaft is journalled in bearings within the pump casing and supports the rotor of a high-frequency electric drive motor having the stator accommodated in the bottom part of the pump casing. The shaft bearings are of a flexible construction.

The stator and rotor vanes are made in the form of a single stack and define passages for molecules of gas being evacuated.

The top part of the pump casing is made in the form of an inlet pipe adapted to be connected to a vessel being evacuated. The outlet pipe, which is designed for connection to a fore-vacuum pump, is arranged on the side surface of the pump casing below the stack of the stator and rotor vanes defining the flow duct of the pump which is separated by a partition from the bottom part of the pump accommodating the drive motor and flexible bearings.

Lubricant is fed to the bearings by an oil pump installed outside the pump housing. Since maximum synchronous speed of an electric motor is as low as 3000 rpm with the power supply from conventional industrial mains of 50/60 Hz, electric drive motors of turbomolecular pumps are usually high-frequency motors with the power supplied from semiconductor or machine-type frequency converters. The converters are connected to industrial mains to step-up frequency to the value required for a high-frequency electric drive motor of a turbomolecular pump to obtain rated rotational speed of 6000, 18000, 24000, 27000 rpm.

Therefore, a frequency converter constitutes an integral part of a turbomolecular pump driven by incorporated motor.

Thus, the above-described turbomolecular pump would generally require an oil pump and a system of pipes, as well as a machine-type frequency converter which are arranged outside the pump casing, and hence they occupy additional floor space. Furthermore these devices require additional maintenance and lower the reliability of pump operation.

The attempts to reduce the size and improve reliability of a pump plant as a whole, which comprises a turbomolecular pump, oil pump and machine-type frequency converter have resulted in the provision of another vertical-type turbomolecular pump.

This pump has a vertically extending cylindrical casing having the bottom and top ends thereof comprising inlet and outlet pipes, respectively, for gas being evacuated.

A pump stator with vanes is mounted in the casing. Discs with vanes fitted on a hollow rotary sleeve are disposed between the stator vanes, and the bottom end of the sleeve is tightly sealed. The sleeve, in combination with the discs fitted thereon, forms the pump rotor. The sleeve is rigidly connected to the rotor of a high-frequency electric drive motor accommodated within the pump casing and is journalled in bearings mounted on a hollow rod which is connected to the top part of the pump casing by means of a stationary member and is tightly sealed at the bottom end. The stator of the high-frequency electric drive motor is also mounted on the rod. In addition, radial passages are provided in the rod, in the zone of the bearings and thereabove, the passages establishing communication of the inner space of the rod with the inner space of the rotary sleeve which is an integral part of the pump rotor. The bottom part of the inner surface of the sleeve is tapered. Lubricant is poured in the inner space of the rod, wherefrom it is fed, via the lower radial passages, to the tapered bottom part of the rotary sleeve and to the lower bearing. During rotation of the sleeve, lubricant is raised under the action of centrifugal forces along the inner surface thereof to lubricate the upper bearing and then is fed, via the upper radial passage of the rod, to the inner space of the rod to return back, under gravity, to the lower bearing. Thus, in operation of the pump, circulation of lubricant through the bearings is effected due to rotation of the sleeve which is an integral part of the pump.

The stator of the high-frequency electric drive motor is power supplied from a generator of a machine-type frequency converter arranged outside the pump casing and occupying an additional floor space. Furthermore, in this pump, the sleeve with the rotor rotate on the outer bearing races. Since the rotational speed of the rotor is tons of thousands rpm, balancing of such rotor is associated wth heavy problems. The strength of the rotor at high rotational speed is also problematic.

These disadvantages are partially eliminated in another turbomolecular high-vacuum pump.

The pump has a vertically extending cylindrical casing having inlet and outlet pipes for gas being evacuated which accommodates a vane-type stator. Discs with vanes are mounted between the stator vanes and are fixed to a rotary sleeve connected to an end of a vertically extending high-speed shaft. The combination of the shaft, sleeve and vane discs forms the pump rotor. A radial space is provided between the shaft and the sleeve to accommodate a fixed cylindrical bushing connected to the pump casing. The bushing accommodates bearings supporting the shaft, a high-frequency electric drive motor and means for lubricating the bearings which comprises an oil pump mounted at the end of the drive motor shaft coaxially with the pump shaft and which is connected thereto by means of a threaded coupling.

Lubricant is fed to the bearings from the oil pump, via a pipeline arranged within the fixed cylindrical bushing.

The high-frequency electric drive motor of the pump is power supplied from a generator of a machine-type frequency converter arranged outside the pump casing.

The above-described pump requires the provision of a machine-type frequency converter which occupies additional floor space, as well as pipelines for feeding lubricant to the bearings. Furthermore, an independent machine-type frequency converter requires additional maintenance which lowers the reliability of the pump.

Known in the art is a turbomolecular high-vacuum pump of the vertical type.

This pump has a vertically extending cylindrical casing provided wth inlet and outlet pipes for gas being evacuated.

The casing accommodates a pump stator having vanes disposed between the vanes of the rotor in such a manner as to define passages for gas being evacuated.

The pump rotor is connected to the upper end of a vertically extending high speed shaft journalled in bearings. The bearings are mounted within a bushing connected to the base of the pump casing. The bushing accommodates also a stator of a high-frequency electric drive motor. The rotor of the electric motor is formed of a part of the rotary shaft of the pump.

The rotary shaft of the pump is also used as means for lubricating the pump bearings. For that purpose, the shaft is made hollow, and the lower end of the shaft is immersed in an oil tank fixed to the pump casing base. In addition, the inner surface of the shaft is made tapered for a part of its length depending on the head required, and radial passages are provided in the zone of the bearings.

During rotation of the high-speed shaft of the pump, lubricant is raised along the inner surface thereof under the action of centrifugal forces and is injected through the radial passages to the bearings in the form of an oil mist. Then the lubricant returns back to the oil tank along a groove provided in the bushing. Thus, during rotation of the pump shaft, continuous circulation of lubricant through the bearings is provided.

In this case, as in the case of the above-described turbomolecular pumps, the high-frequency electric drive motor is supplied with high-frequency voltage from a generator of a machine-type frequency converter arranged outside the pump casing.

The use of an independent frequency converter which occupies an additional floor space makes the pump less compact and its operation less self-maintaining (especially in movable vacuum stations, such as in those used for assembly lines), requires additional maintenance, lowers the reliability of the pump and reduces its service life. Finally such a construction makes the operation of the pump more complicated and diffucult.

In addition, lubricant feeding to the pump bearings is not effected upon starting the pump, but only after the pump rotor gains a predetermined and sufficiently high speed which is near the rated speed. Thus, the bearings operate without lubrication for a certain time so that their life is reduced.

It is an object of the invention to provide a compact pump, having reduced dimensions, especially in the plan view.

Another object of the invention is to provide for self-maintaining operation of the pump, especially when used for assembly line pump plants.

Still another object of the invention is to provide simple and convenient operation of the pump.

Among other objects of the invention is an improvement of means for feeding lubricant to the bearings (feeding of a lubricant to the bearings at the initial moment of the pump operation). Further object of the invention is to prolong service life of the pump bearings due to improved lubrication thereof and to relieve the axial lead imposed by the weight of the rotor.

Finally, it is an object of the invention to improve the reliability and prolong service life of the pump.

The above objects are accomplished by that in a turbomolecular high-vacuum pump having a substantially vertical cylindrical casing provided with inlet and outlet pipes for gas being evacuated accommodating, in the top part thereof, a stator having vanes which are disposed between the rotor vanes to define passages for gas being evacuated, a rotor connected to a substantially vertical high-speed hollow shaft journalled in bearings and connected to a high-frequency electric drive motor, and means for lubricating the bearings, the high-frequency drive motor being electrically coupled to a generator of a machine-type frequency converter having an induction drive motor, according to the invention, there is provided another, low-speed shaft mounted in the bottom part of the pump casing in other bearings coaxially with the high-speed shaft, one shaft embracing the other, the rotors of the drive motor and generator of the machine-type frequency converter being mounted on the low-speed shaft, and the stators of these devices being fixed to the pump casing, means for lubricating the shaft bearings being arranged at the lower end of the low-speed shaft.

This provides for a very compact construction of the pump in the plan view and for self-maintaining operation thereof, because the machine, type frequency converter and means for lubricating the bearings are arranged within the cylindrical casing of the pump.

In addition, with such a construction, lubricant is fed to the pump bearings immediately upon the starting.

The inner space of the high-speed shaft is preferably made cylindrical, and the end of the high-speed shaft facing the end of the low-speed shaft is preferably provided with a bottom wall having a central cylindrical orifice having the diameter which is substantially smaller than the inside diameter of the shaft. This facilitates the manufacture of the end of the high-speed shaft while maintaining its operability, because with such a construction lubricant can be raised along the inner surface of the shaft under the action of centrifugal forces.

Means for feeding lubricant to the bearings of both shafts may comprise a helical groove on the outer side of the low-speed shaft which is disposed, with a minimum radial space, in a cylindrical sleeve mounted in a lubricant tank and communicating therewith, the end of the low-speed shaft facing the lubricant tank being tightly sealed, and the shaft having an annular groove in the zone of termination of the helical groove, and radial passages establishing communication of the annular groove with the inner space of the shaft. This facility enables simplification of means for lubricating and reduction of the vertical size of the pump as a whole due to compactness of the construction according to the invention.

The machine-type frequency converter is preferably accommodated within one and the same space with the drive motor of the pump, and this space is preferably separated by a partition from the stator and rotor of the pump and is connected to the outlet pipe of the pump.

This allows the rate of evacuation to be increased and the evacuation to be made more accurately due to the provision of greater flow sections, and makes it possible to improve the vacuum purity within the pump.

The high-speed shaft is preferably provided with a disc made of a ferromagnetic material which is disposed in the magnetic field of an annular permanent magnet mounted within the pump casing.

This facility prolongs the service life of the bearings by relieving them from the axial load imposed by the weight of the pump rotor.

The rotor of the generator of the machine-type frequency converter is preferably of a claw-shaped rotor-type with the claws made of a magnetically conductive material with one or several permanent magnets mounted between the claws.

This construction eliminates the need of supplying the rotor of the frequency converter generator with electric current thus dispensing with the use of electric sliding contacts which exhibit sparking, are rapidly worn and unreliable, especially in vacuum. Thus a simple, compact and reliable construction of the machine-type frequency converter is ensured, and hence that of the turbomolecular pump according to the invention, as a whole.

The turbomolecular high-vacuum pump according to the invention may be supplied directly from three-phase industrial mains 3 × 380 V, 50/60 Hz and has the following specifications:

| | |
|---|---|
| Evacuation rate | 500 l/s |
| Rotor speed | 27000 rpm |
| Ultimate vacuum | not lower than $10^{-10}$ Torr |
| Dimensions: | |
| Diameter in the plan view | 280 mm |
| Height | 550 mm. |

The pump according to the invention provides for:
extremely simple and independent lubrication system due to the absence of pipelines;
operation directly from industrial mains at 50/60 Hz;
simple and convenient operation; substantially no maintenance with continuous operation;
high reliability;
compactness; the pump occupies minimum floor space within a circle;
noiseless operation, because all rotors rotate in vacuum;
the pump efficiency is thus also improved;
substantially oilless vacuum.

Other features and advantages of the invention will become apparent from the following detailed description with reference to the accompanying drawings, in which.

Figure 1:
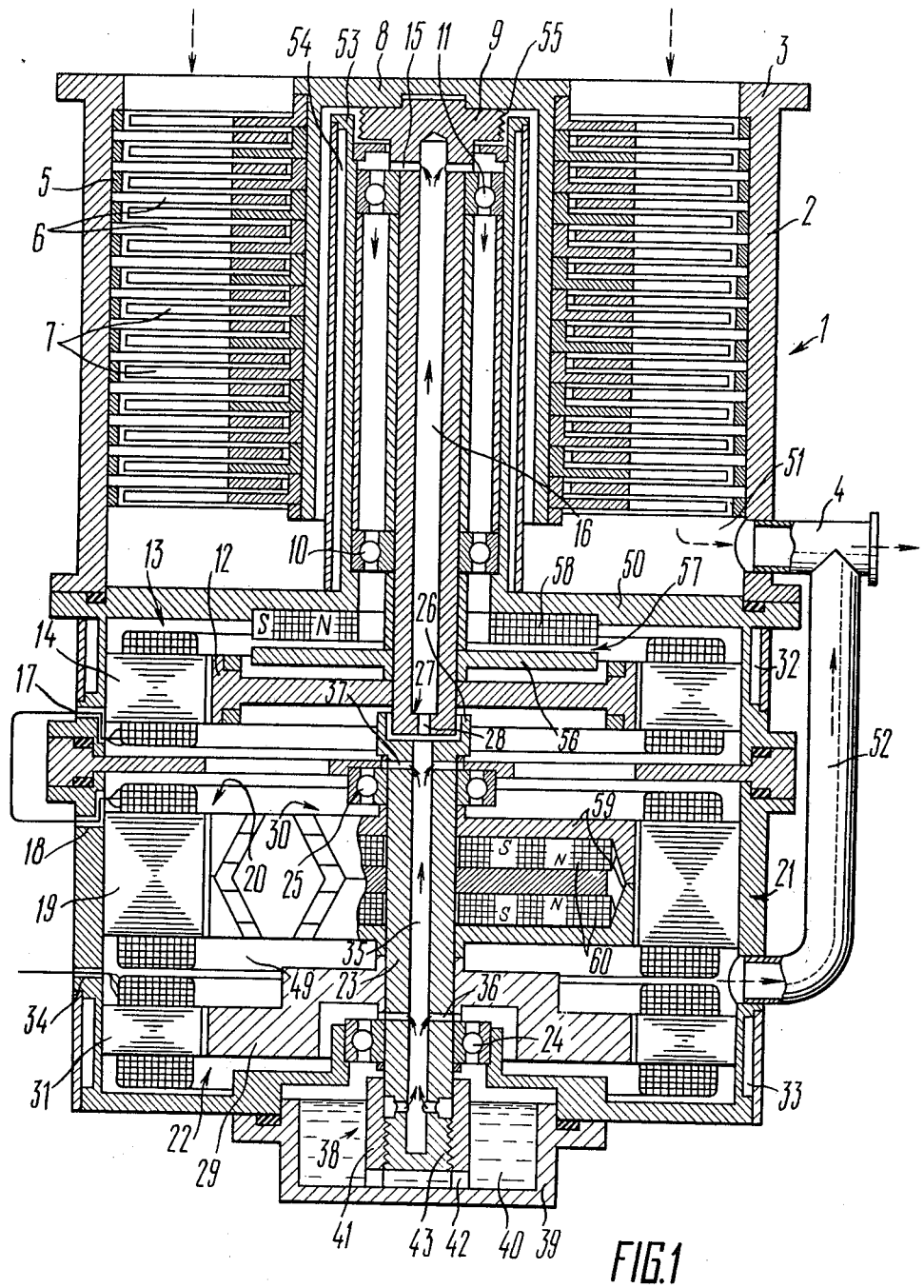
FIG. 1 shows a longitudinal section of the turbomolecular high-vacuum pump according to the invention.

The turbomolecular high-vacuum pump 1 (FIG. 1) according to the invention comprises a vertically extending cylindrical casing 2 having an inlet pipe 3 and an outlet pipe 4 for gas being evacuated. A stator 5 having vanes 6 is mounted within the casing 2, in the top part thereof. Vanes 7 of a rotor 8 of the pump are arranged between the vanes 6 of the stator 5 to define passages for molecules of gas being evacuated. The pump rotor 8 is connected to a substantially vertical high-speed hollow shaft 9. The shaft is journalled in bearings 10 and 11 and supports a rotor 12 of a high-frequency electric drive motor 13 having a stator 14 mounted within the casing 2 of the pump.

The shaft 9 is provided with radial passages 15 located slightly above the bearing 11.

The inner space 16 of the shaft 9 is cylindrical.

In order that the rotor 8 of the pump can gain rated rotational speed of e.g. 27000 rpm, the stator 14 of the high-frequency electric drive motor 13 is electrically coupled, via sealed inlets 17, 18, to a stator 19 of a generator 20 of a machine-type frequency converter 21 provided with an induction drive motor 22.

A hollow low-speed shaft 23 is mounted coaxially with the high-speed shaft 9 in the bottom part of the casing 2, and the low-speed shaft is journalled in bearings 24 and 25. The shaft 23 embraces the shaft 9. For that purpose, the upper portion of the shaft 23 is provided with an enlargement 26 which receives the lower end of the high-speed shaft 9 with a minimum space therebetween.

The embraced end of the high-speed shaft 9 is provided with an end wall 27 having a central cylindrical orifice 28 of a diameter which is smaller than the inside diameter of the shaft.

The low-speed shaft 23 supports a rotor 29 of the induction motor 22 and a rotor 30 of the generator 20 of the machine-type frequency converter 21. A stator 31 of the induction motor 22 and the stator 19 of the generator 20 of the machine-type frequency converter 21 are mounted in the casing 2 of the pump. Spaces 32 and 33 are provided in the zones of location of the stators 14 and 31 of the electric motors respectively, within the casing 2 for feeding circulating cooling water (inlets and outlets not shown).

The stator 31 is connected, via a sealed inlet 34, to three-phase industrial mains 3 × 380 V, 50/60 Hz.

The inner space 35 of the low-speed shaft 23 is cylindrical. The shaft 23 is provided wth radial passages 36 and 37 arranged in the zone of location of the bearings 24 and 25.

The pump is provided with means 38 for lubricating the bearings 10, 11, 24 and 25 of both shafts 9 and 23.

A tank 39 containing lubricant 40 is arranged in the bottom wall of the casing 2 of the pump.

A cylindrical sleeve 41 with through openings 42 for passage of lubricant from the tank 39 into the inner space of the sleeve is mounted at the center of the tank 39.

Figure 2:
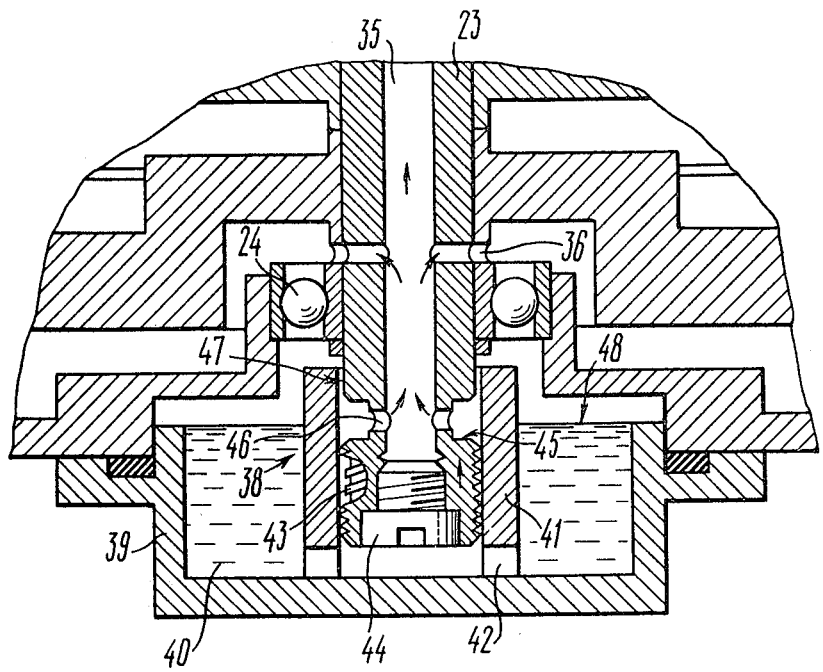
FIG. 2 is an enlarged sectional view of means for lubricating the bearings.

Means 38 (FIG. 2) for lubricating the bearings 10, 11, 24 and 25 comprises a helical groove 43 made on the portion of the low-speed shaft 23 which is received, with minimum radial space, in the cylindrical sleeve 41. The end of the shaft 23 facing the tank 39 is tightly sealed, e.g. by means of a screw 44.

The shaft 23 is provided, in the zone of termination of the helical groove 43, with an annular groove 45 and radial passages 46 establishing communication of the annular groove 45 with the inner space 35 of the shaft 23.

A smooth portion 47 of the shaft 23 above the groove 45 is inserted into the cylindrical sleeve with minimum space therebetween to provide, in this zone, a contactless dynamic seal preventing the lubricant from directly entering the tank from the surface 47.

In order to eliminate backward overflow of lubricant 40, a pouring level 48 is slightly below the board of the cylindrical sleeve 41.

In order to improve the vacuum cleanliness, the machine-type frequency converter 21 (FIG. 1) is arranged in one and the same space 49 with the high-frequency electric drive motor 13 of the pump. The space 49 is separated by means of a partition 50 from a space 51 accommodating the stator 5 and the rotor 8 of the pump. The space 49 communicates, via a pipe 52, with the outlet pipe 4 of the pump.

The partition 50 has a cylindrical bushing 53 accommodating the bearings 10, 11 of the high-speed shaft 9. The bushing 53 has a cylindrical space 54 for feeding cooling water to the bearings 10 and 11 (inlet and outlet not shown).

A helical groove 55 is provided on the surface of the shaft 9 in the zone above the bearing 11 for defining a contactless labyrinth dynamic seal between the shaft 9 and the bushing 53 which prevents oil vapours from penetrating the flow duct of the pump.

In order to relieve the bearings 10 and 11 from the axial load of the rotor 8 of the pump, there is provided, on the high-speed shaft 9, a disc 56 which is made of a ferromagnetic material and arranged with an axial gap 57 in the magnetic field of an annular permanent magnet 58 mounted on the partition 50.

In order to eliminate the need of supplying the rotor 30 of the generator 20 of the machine-type frequency converter 21 wth electric current, as well as to provide for simplicity, compactness and high reliability of the frequency converter, the rotor 30 is of a known per se claw-shaped rotor-type. The rotor comprises claws 59 made of a magnetically conductive material and one or several permanent magnets 60 (such as barium oxide magnets) mounted between the claws 59.

Figure 3:
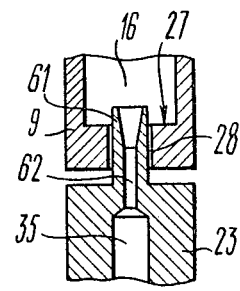
FIG. 3 is an enlarged sectional view showing an embodiment of the joint of the low-speed and high-speed shafts.

Another embodiment of the joint between the high-speed shaft 9 and low-speed shaft 23 is shown in FIG. 3. In this embodiment, the lower end of the high-speed shaft is the same, and the upper end of the low-speed shaft is provided with a thin cylindrical projection 61 having a passage 62, and this projection is received, with a minimum space, in the orifice 28 of the end wall 27 of the high-speed shaft 9.

The turbomolecular high-vacuum pump functions in the following manner.

Prior to the starting of the pump 1, a vessel being evacuated (not shown) which is connected to the inlet pipe 3 of the pump, as well as the inner spaces 49 and 51 of the pump are evacuated through the outlet pipe 4 by means of a fore-vacuum pump (not shown) to a pressure of the order of $10^{-1}$–$10^{-3}$ Torr. The direction of evacuation is shown with dotted arrows (FIG. 1).

Then a supply voltage is fed from three-phase industrial mains 3 × 380 V, 50/60 Hz, via the sealed inlet 34, directly to the winding of the stator 31 of the induction drive motor of the machine-type frequency converter 21, and the low-speed shaft 23 is driven by the rotor 29 of this motor. Thus the claw-shaped rotor 30 of the generator 20 also starts to rotate and induces electromotive force in the stator 19 (emf) at a high frequency, that is applied, via a cable and the sealed inlets 18 and 17, to the stator 14 of the high-frequency electric drive motor 13 of the pump. The rotor 12 of this motor rotates the high-speed shaft 9 of the rotor 8 of the pump.

Thus further evacuation of the vessel being evacuated is effected by means of the turbomolecular pump due to interaction of the rotating vanes 7 of the rotor 8 and the fixed vanes 6 of the stator 5. Therefore, the turbomolecular pump operates in tandem with the fore-vacuum pump (not shown).

The shafts 9 and 23 are accelerated. The low-speed shaft 23 of the machine-type frequency converter 21 gains the rated speed near to 3000 rpm with the number of pole pairs of the stator 31 equal to unit. The high-speed shaft 9 of the turbomolecular pump also gains its rated speed which is determined by the frequency of the electromotive force applied from the stator 19 of the generator 20 to the stator 14 of the high-frequency electric drive motor 13. This frequency is, in turn, determined by the number of pole pairs, that is the number of claws 59 of the rotor 30 of the generator 20 between which the permanent magnets 60 are mounted, from the formula:

$$f = (p \cdot n/60) \qquad (1)$$

wherein $f$ is frequency of the voltage obtained from the stator 19 of the generator 20, Hz;

$p$ is number of pole pairs (claws 59) of the generator 20;

$n$ is rotational speed of the low-speed shaft 23, rpm.

Thus, with $p = 9$ and $n = 3000$ rpm $$f = \frac{9 \cdot 3000}{60} = 450 \text{ Hz.}$$

The rotational speed of the high-speed shaft 9 of the pump is determined from the formula:

$$n_1 = (60 \cdot f/p_1) \qquad (2)$$

wherein $n_1$ is rotational speed of the high-speed shaft 9 of the pump, rpm;

$p_1$ number of pole pairs of the stator 14 of the high-frequency electric drive motor 13 of the pump. Thus, with $p_1 = 1$:

$$n_1 = \frac{60 \cdot 450}{1} = 27000 \text{ rpm.}$$

Substituting (1) for (2), the direct relationship of the speeds of the shafts 9 and 23 is obtained depending on the number of pole pairs (claws 59) of the generator 20 and stator 14 of the drive motor of the pump:

$$n_1 = \frac{60}{p_1} - \frac{p \cdot n}{60} = \frac{p \cdot n}{p_1} \tag{3}$$

Since generally the drive motor of the pump is a two-pole motor, that is $p_1 = 1$, and the synchronous speed of the drive motor of the generator of the machine-type frequency converter, that is of the shaft 23, $n = 3000$ rpm, $$n_1 = 3000 \, p \tag{4}$$

From the moment of starting of the pump, that is from the beginning of rotation of the shaft 23, the means 38 for feeding lubricant to the bearings 10, 11, 24 and 25 is actuated. The helical groove 43 starts forcing the lubricant 40 fed to the end of the shaft 23 from the oil tank 39 along the passages 42 into the annular groove 45 (FIG. 2), and therefrom, via the radial passages 46, to the inner space 35 of the low-speed shaft 23. It should be noted that backward flow of lubricant over the upper end of the cylindrical sleeve 41 projecting above the level 48 of the lubricant 40 in the tank 39 is substantially eliminated due to the provision of the contactless dynamic seal defined by the inner wall of the sleeve 41 and the smooth portion 47 of the shaft 23 having its end sealed, by the screw 44. The oil head increases with the rotational speed of the shaft 23. The injected lubricant 40 is fed from the inner space 35 of the low-speed shaft 23 into the inner space 16 of the high-speed shaft 9. The lubricant is fed, via the radial passages 36, 37 and 15, to the bearings 24, 25 and 11 of both shafts, respectively. Since the shaft 9 is the high-speed shaft, the lubricant is fed to the bearing 11 in the form of an oil mist which provides for the best quality of lubrication.

The lubricant flows down to the bearing 10 from the bearing 11. However, the bearing 10 may also be independently lubricated. For that purpose, the shaft 9 should be provided with additional radial passages similar to the passages 15 in the zone of the bearing 11.

The lubricant returns back under gravity to the tank 39 mounted on the bottom wall 2 of the pump casing from the bearings 10, 11, 24 and 25 via a system of drain passages (not shown). Thus, a continuous circulation of lubricant through the bearings is established during operation of the pump (which is shown with solid arrows in FIGS. 1 and 2).

In order to reduce oil leakage in the zone of the joint of the lower end of the shaft 9 and the upper end 26 of the shaft 23, a contactless labyrinth seal may be provided.

For stopping the pump, the stator 31 is disconnected from the mains, whereafter the shafts 9 and 23 starts running-out concurrently until they completely stop. Where necessary, electrical braking of the rotors 12 and 29 may be effected by any appropriate method.

After the shafts 9 and 23 are stopped, all circulating oil returns back under gravity to the tank 39, via the drain passages and the spaces 16 and 35 of the shafts 9 and 23.

Both during the standby and running conditions of the pump, the ball bearings 10 and 11 of the high-speed shaft 9 are relieved from the axial load of the weight of the rotor 8 due to the attraction of the ferromagnetic disc 56 to the annular permanent magnet 58 mounted on the partition 50, through the working gap 57. It should be noted, that the selection of the lifting force of the manget and the amount of the working gap may give any desired degree of unloading of the bearings 10 and 11. This facility greately improves the conditions for operation of the high-speed bearings, thus prolonging their service life.

FIG. 3 shows the alternative embodiment of the joint between the shafts 9 and 23.

In this embodiment, the operation of the pump is generally similar to that described above. It should be, however, noted that the amount of lubricant fed from the space 35 of the shaft 23 to the space 16 of the shaft 9 is metered by the passage 62 of the cylindrical projection 61. After being fed to the surface 27, the oil is thrown by centrifugal forces against the cylindrical wall of the space 16 to be raised therealong in the form of a thin layer up to the radial passages 15 wherefrom it is injected, in the form of an oil mist to the bearing 11. With this construction, there is practically no oil leakage through the joint between the shafts 9 and 23.

It should be born in mind that the embodiments of the invention illustrated in the accompanying drawings and described hereinabove are only preferable embodiments thereof. Various embodiments and modifications may be used as regards the shape, dimensions and relative arrangement of various elements. Thus the parts of the pump shown in the drawings may be replaced by their equivalents. Certain elements of the pump may be used independently of others, and all modifications will not deviate from the spirit and scope of the invention set forth in the appended claims.

What is claimed is:

1. A turbomolecular high-vacuum pump comprising:
    a substantially vertically extending cylindrical casing;
    an inlet pipe for gas being evacuated provided on said casing;
    an outlet pipe for gas being evacuated provided on said casing;
    a pump stator having vanes accommodated in said casing, in the top part thereof;
    a pump rotor having vanes accommodated in said casing, said vanes being disposed between said stator vanes to define passage for gas being evacuated;
    bearings arranged within said casing;
    a substantially vertically arranged high-speed hollow shaft extending within said casing, in the top part thereof, said shaft extending coaxially with said casing, being journalled in said bearings and connected to said rotor;
    other bearings arranged within said casing;
    a hollow low-speed shaft extending in the bottom part of said casing coaxially with said high-speed shaft, said low-speed shaft being journalled in said other bearings;
    said shafts embracing each other at the ends facing each other for a part of their length;
    a high-frequency electric drive motor arranged within said casing;
    a rotor of said high-frequency electric drive motor connected to said high-speed shaft;
    a stator of said high-frequency electric drive motor mounted in said casing;
    a machine-type electric frequency converter accommodated in said casing;
    an induction drive motor connected to said machine-type frequency converter being energizable through a source of power;

a generator electrically coupled to said machine-type frequency converter of said high frequency electric drive motor;

a rotor of said induction drive motor being mounted on said low-speed shaft;

a stator of said induction motor being fixed to said casing;

a stator of said generator being fixed to said casing and electrically coupled to said stator of said high-frequency electric drive motor;

means for lubricating the bearings, said means being arranged within said casing and mounted at the lower end of said low-speed shaft.

2. A turbomolecular high-vacuum pump according to claim 1, comprising: a bottom wall having a central cylindrical orifice which seals the end of said high-speed shaft facing the end of said low-speed shaft, said high-speed shaft having a cylindrical inner space;

the diameter of said orifice being smaller than the inside diameter of said high-speed shaft.

3. A turbomolecular high-vacuum pump according to claim 1, wherein said means for lubricating the bearings comprises: an oil tank; a cylindrical sleeve mounted in said tank and communicating therewith; a helical groove provided on the outer surface of said low-speed shaft for a part of its length which is received, with minimum radial space, in said cylindrical sleeve; the end of said low-speed shaft facing said oil tank being tightly sealed; an annular groove provided on said low-speed shaft in the zone of termination of said helical groove; radial passages provided in said low-speed shaft establishing communication of said annular groove with the inner space of said shaft.

4. A turbomolecular high-vacuum pump according to claim 2, wherein said means for lubricating the bearings comprises: an oil tank; a cylindrical sleeve mounted in said oil tank and communicating therewith; a helical groove provided on the outer surface of said low-speed shaft for a part of its length the low-speed shaft being received with minimum radial space in said cylindrical sleeve; the end of said low-speed shaft facing said oil tank being tightly sealed; an annular groove provided on said low-speed shaft in the zone of termination of said helical groove; radial passages provided in said low-speed shaft establishing communication of said annular groove with the inner space of said shaft.

5. A turbomolecular high-vacuum pump according to claim 1, includng: a partition which divides the inner space of said casing into two parts, one part accommodating said stator and rotor of the pump, and the other part accommodating said machine-type frequency converter and high-frequency electric drive motor, the latter part communicating with said outlet pipe.

6. A turbomolecular high-vacuum pump according to claim 2, including: a partition which divides the inner space of said casing into two parts, one part accommodating said stator and rotor of the pump, and the other part accommodating said machine-type frequency converter and high-frequency electric drive motor, the latter part communicating with said outlet pipe.

7. A turbomolecular high-vacuum pump according to claim 3, including: a partition which divides the inner space of said casing into two parts, one part accommodating said stator and rotor of the pump, and the other part accommodating said machine-type frequency converter and high-frequency electric drive motor, the latter part communicating with said outlet pipe.

8. A turbomolecular high-vacuum pump according to claim 1, including: an annular permanent magnet mounted within said casing; a disc of a ferromagnetic material mounted on said high-speed shaft and arranged in the magnetic field of said annular permanent magnet.

9. A turbomolecular high-vacuum pump according to claim 2, including: an annular permanent magnet mounted within said casing; a disc of a ferromagnetic material mounted on said high-speed shaft and arranged in the magnetic field of said annular permanent magnet.

10. A turbomolecular high-vacuum pump according to claim 3, including: an annular permanent magnet mounted within said casing; a disc of a ferromagnetic material mounted on said high-speed shaft and arranged in the magnetic field of said annular permanent magnet.

11. A turbomolecular high-vacuum pump according to claim 5, including: an annular permanent magnet mounted within said casing; a disc of a ferromagnetic material mounted on said high-speed shaft and arranged in the magnetic field of said annular permanent magnet.

12. A turbomolecular high-vacuum pump according to claim 1, wherein said rotor of the generator of said machine-type frequency converter comprises a claw-shaped rotor having: claws of a magnetically conductive material; at least one permanent magnet mounted between said claws.

13. A turbomolecular high-vacuum pump according to claim 2, wherein said rotor of the generator of said machine-type frequency converter comprises a claw-shaped rotor having claws of a magnetically conductive material; at least one permanent magnet mounted between said claws.

14. A turbomolecular high-vacuum pump according to claim 3, wherein said rotor of the generator of said machine-type frequency converter comprises a claw-shaped rotor having: claws of a magnetically conductive material; at least one permanent magnet mounted between said claws.

15. A turbomolecular high-vacuum pump according to claim 5, wherein said rotor of the generator of said machine-type frequency converter comprises a claw-shaped rotor having: claws of a magnetically conductive material; at least one permanent magnet mounted between said claws.

16. A turbomolecular high-vacuum pump according to claim 8, wherein said rotor of the generator of said machine-type frequency converter comprises a claw-shaped rotor having: claws of a magnetically conductive material; at least one permanent magnet mounted between said claws.

* * * * *